Sept. 20, 1971     C. E. QUISENBERRY     3,606,475
WHEEL ASSEMBLY
Filed Aug. 6, 1969
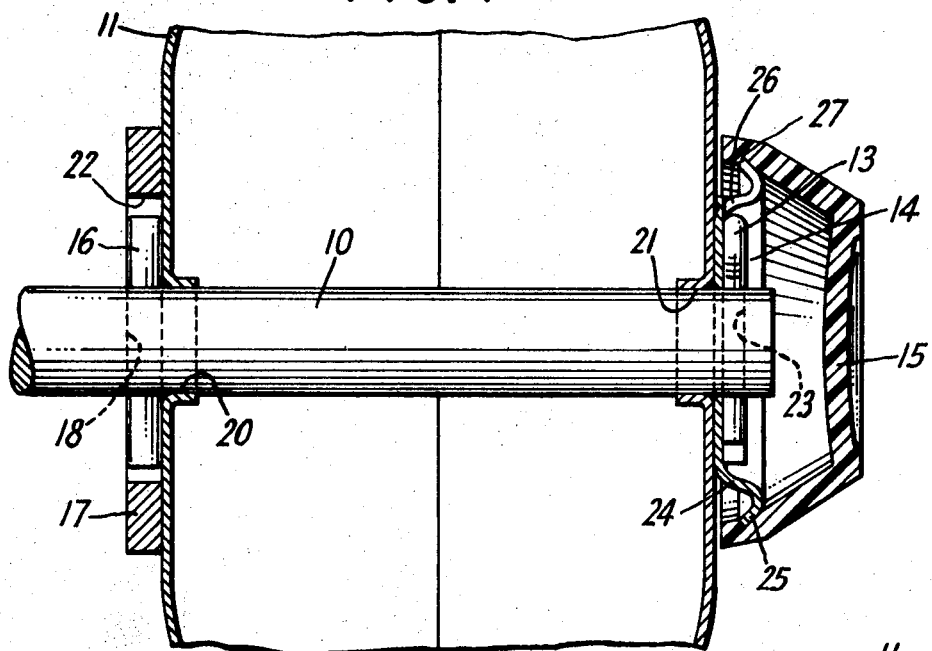
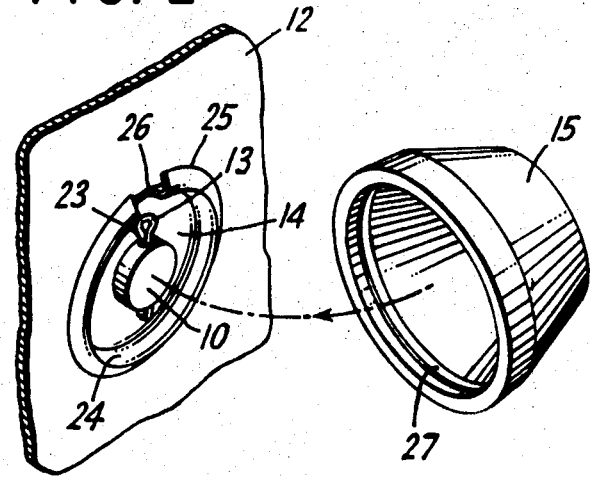
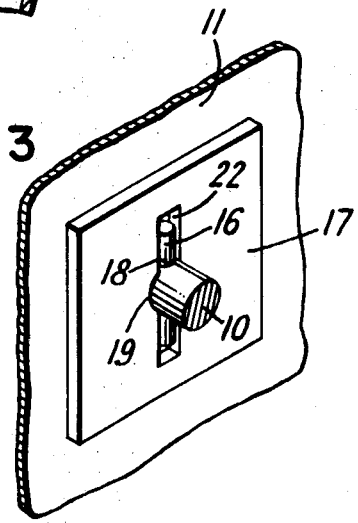
INVENTOR.
CARTER E. QUISENBERRY
BY Walter Lewis
ATTORNEY 3,606,475
WHEEL ASSEMBLY
Carter E. Quisenberry, Olney, Ill., assignor to
AMF Incorporated
Filed Aug. 6, 1969, Ser. No. 847,911
Int. Cl. B60b 27/06
U.S. Cl. 301—112          5 Claims

ABSTRACT OF THE DISCLOSURE

The wheel is retained on its axle by a flanged washer and straight cotter pin. The cotter pin is inserted into the axle cotter pin hole through a slot formed in the washer flange, and the cotter pin and washer are covered by a hub cap which is snap engaged with the washer flange.

---

This invention relates to a wheel assembly, and more particularly, to a low cost drive wheel assembly for a juvenile vehicle or the like, which has a minimum number of parts and is easy to assemble and disassemble.

The features of the invention which are believed to be novel are set forth with particularity in the appended claims. The invention itself, however, both as to its organization and operation, together with further objects and advantages thereof, may best be understood by reference to the following description taken in connection with the accompanying drawings in which:

FIG. 1 is a broken away elevational view of a preferred form of the invention;

FIG. 2 is a broken away and exploded perspective view of the right hand side of FIG. 1; and FIG. 3 is a broken away perspective view of the left hand side of FIG. 1.

The wheel assembly in the drawings shows a drive shaft or axle 10 having a wheel comprising two spaced wheel plates 11 and 12 mounted thereon. The outer extremity of axle 10 has a straight cotter pin 13, washer 14, and hub cap 15 subassembly. The left or inner side of the wheel has a drive pin 16 and drive plate 17 subassembly.

The drive plate 17 is flat and perpendicular to axle 10. Drive plate 17 is fixed to inner side wheel plate 11 by means such as welding or the like. Axle 10 has a hole 18 formed therein for the drive pin 16. The drive plate 17 has a central aperture 19 which is aligned with the through apertures 20 and 21 of the wheel plates. Drive plate 17 also has a slot 22 which is just long enough to nest the drive pin 16 therein. Slot 22 intersects the drive plate aperture 19. Pin 16, hole 18, slot 22 and plate 17 comprise the drive connection between axle 10 and the wheel so that the two turn together.

The cotter pin 13 is positioned at the outer extremity of axle 10 closely adjacent to the outer side wheel plate 12. A hole 23 is provided in the axle 10 for the cotter pin 13. Washer 14 is disposed between the cotter pin 13 and outer side wheel plate 12. Washer 14 has an outwardly extending circumferential flange 24 formed thereon, and the outer rim of flange 24 is reverse bent to provide a radially outward and circumferentially extending lip 25 thereon. The flange 24 and its lip 25 have a slot 26. The cotter pin 13 is positioned in its hole 23 by inserting it through the slot 26.

The outer end of axle 10, washer 14, and cotter pin 13 are covered by the hub cap 15. Hub cap 15 is cup shaped and constructed from plastic material. The inside of hub cap 15 has a circumferential groove 27 formed therein adjacent the open end of its cap shape. The hub cap is retained in position by forcing the hub cap on to the washer 14 to snap engage the groove 27 and washer lip 25 together.

Since the hub cap 15 surrounds the washer 14 it closes the slot 26. Therefore, the washer 14 and hub cap 15 retain the cotter pin 13 in place even though its shape is straight. The spacing between the two axle pin holes 18 and 23 is just sufficient to receive the wheel and washer 14 between the two pins 13 and 16. Therefore, the cotter pin 13 retains the wheel in drive relationship with the axle 10, since once cotter pin 13 is in place it retains the drive pin 16 inside the drive plate slot 22. To disassemble the assembly it is only necessary to pry a sharp tool between the edge of the hub cap 15 and wheel plate 12 to snap the hub cap 15 off the washer 14. Thereafter the cotter pin, which can be straight, is merely withdrawn from the axle 10 through the washer slot 26, after which the remaining parts of the wheel assembly are readily removable. For assembly of the parts the reverse procedure is followed. That is to say, first the drive pin 16 and wheel are assembled in axle 10, and then the assembly is completed by adding the washer 14, cotter pin 13, and finally the hub cap 15.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed:

1. A wheel assembly, comprising a wheel, an axle, the center of said wheel having a through aperture formed therein, said axle passing through said aperture whereby said wheel is mounted on said axle, a cotter pin hole formed in the outer extremity of said axle, said hole extending through said shaft at a location closely adjacent to the outer side of said wheel, a washer on said axle between said outer wheel side and hole, a cotter pin in said hole outboard of said washer, said washer having a relatively flat central portion and axially and radially outwardly directed circumferentially extending flange formed on the periphery thereof, a slot formed in said flange to enable said cotter pin to be positioned in said hole by inserting said cotter pin through said slot, and a hub cap for the outer end of said axle, said hub cap comprising a cup shaped member, and groove means formed on said hub cap engageable with said flange for retaining said hub cap on the outer end of said axle in covering relationship with respect to said washer and cotter pin.

2. In a wheel assembly as in claim 1, said axle comprising the rear wheel drive axle of a juvenile vehicle, a drive plate fixed to the other side of said wheel, an aperture formed in said drive plate, said drive plate aperture being aligned with the through aperture of said wheel, the plane of said drive plate being disposed perpendicular to said axle, another hole formed in said axle, a slot formed in said drive plate, said slot intersecting said drive plate aperture, and a drive pin positioned in said slot and extending through said another axle hole whereby said wheel is drive connected to said axle.

3. In a wheel assembly as in claim 2, wherein said wheel comprises a pair of wheel plates which are spaced from each other adjacent the central portion of said wheel, said through aperture extending in alignment through both of said wheel plates, one of said plates comprising the outer side of said wheel and the other of said plates comprising the other side of said wheel, said other side of said wheel comprising its inner side, said drive plate being fixed to said inner side wheel plate.

4. In a wheel assembly as in claim 3, wherein the outer rim of said washer flange has a reverse bend in it to provide a circumferentially and radially outward extending lip thereon, said hub cap being constructed from plastic material, a circumferential groove formed in said hub cap adjacent the open end of its cup shape, and said washer lip and hub cap groove being snap engageable with each other to retain said hub cap in assembled position, said washer flange and its surrounding hub cap serving to retain said cotter pin in its axle hole even though said cotter pin has a straight shape.

5. In a wheel assembly as in claim 4, wherein the spacing between said two axle holes is just sufficient to receive said wheel plates and said washer between said two pins, said cotter pin serving to retain said drive pin positioned in said drive plate slot to maintain drive relationship between said axle and wheel, said wheel assembly being adapted to be disassembled by prying said hub cap off said washer and withdrawal of said cotter pin from the cotter pin axle hole through the flange slot.

References Cited

UNITED STATES PATENTS

| | | | |
|---|---|---|---|
| 750,501 | 1/1904 | Tarbox | 301—113UX |
| 1,522,548 | 1/1925 | Schibrowski | 301—112X |
| 1,552,571 | 9/1925 | Sanford | 301—113X |
| 2,241,686 | 5/1941 | Ware | 301—108(R) |
| 3,111,347 | 11/1963 | Miller | 301—108(R) |

FOREIGN PATENTS

| | | | |
|---|---|---|---|
| 640,472 | 7/1950 | Great Britain | 301—113 |

RICHARD J. JOHNSON, Primary Examiner

U.S. Cl. X.R.

301—108